(12) United States Patent
Hars

(10) Patent No.: US 8,805,905 B2
(45) Date of Patent: Aug. 12, 2014

(54) ON-LINE RANDOMNESS TEST FOR RESTART RANDOM NUMBER GENERATORS

(75) Inventor: Laszlo Hars, Cranberry Township, PA (US)

(73) Assignee: Seagate Technology LLC, Cupertino, CA (US)

( * ) Notice: Subject to any disclaimer, the term of this patent is extended or adjusted under 35 U.S.C. 154(b) by 1078 days.

(21) Appl. No.: 11/856,762

(22) Filed: Sep. 18, 2007

(65) Prior Publication Data

US 2009/0077146 A1  Mar. 19, 2009

(51) Int. Cl.
*G06F 7/58* (2006.01)

(52) U.S. Cl.
USPC .......................................... 708/250; 708/251

(58) Field of Classification Search
None
See application file for complete search history.

(56) References Cited

U.S. PATENT DOCUMENTS

| | | | |
|---|---|---|---|
| 6,675,113 B2 | 1/2004 | Hars | |
| 6,947,960 B2 | 9/2005 | Hars | |
| 6,993,543 B2 | 1/2006 | Hars | |
| 7,031,991 B2 | 4/2006 | Hars | |
| 7,047,262 B2 | 5/2006 | Hars | |
| 7,124,155 B2 | 10/2006 | Hars | |
| 7,149,764 B2 | 12/2006 | Henry et al. | |
| 2003/0156713 A1 | 8/2003 | Hars | |
| 2003/0158875 A1 | 8/2003 | Hars | |
| 2003/0158876 A1 | 8/2003 | Hars | |
| 2003/0187598 A1 | 10/2003 | Hars | |
| 2003/0187889 A1 | 10/2003 | Hars | |
| 2003/0187890 A1 | 10/2003 | Hars | |
| 2003/0200238 A1 | 10/2003 | Hars | |
| 2003/0200239 A1 | 10/2003 | Hars | |
| 2004/0103131 A1* | 5/2004 | Henry et al. | 708/250 |
| 2005/0204220 A1* | 9/2005 | Yasuda et al. | 714/724 |
| 2007/0005673 A1* | 1/2007 | Lablans | 708/250 |

FOREIGN PATENT DOCUMENTS

| | | |
|---|---|---|
| EP | 1447740 | 8/2004 |
| EP | 1662375 | 5/2006 |

* cited by examiner

*Primary Examiner* — Michael D Yaary
(74) *Attorney, Agent, or Firm* — Cesari & Reed LLP; Kirk A. Cesari; David K. Lucente

(57) ABSTRACT

An apparatus includes a first counter for counting successive bits representative of a logic 1, and a second counter for counting successive bits representative of a logic 0, wherein a first predetermined count on the first counter or a second predetermined count on the second counter indicates a randomness failure. A method for testing randomness performed by the apparatus is also included.

20 Claims, 2 Drawing Sheets

ON-LINE RANDOMNESS TEST FOR RESTART RANDOM NUMBER GENERATORS

BACKGROUND

One type of random number generator uses a drifting oscillator, designed to have large phase jitter. If the oscillator output is sampled slowly enough, the sample values will be effectively random. An appropriate sampling rate must be utilized. If the sampling rate is too fast, the sample values will be mostly determined by the ratio of the oscillator frequency and the sample rate. If this ratio is not simple, as for example 2:1 or 3:5, the sample sequence will look random, but in fact it will be pseudo-periodic (meaning that the sequence deviates from a periodic one only in a few places, determined by the occasional above average noise levels in the circuit). Detecting this problem on-line, that is, with a simple circuit constantly analyzing the generated sample sequence, is difficult because a pseudo-period can be quite long, and so large buffers are necessary.

To avoid the problem of hard to detect low entropy, restart mode random number generators have been proposed. After each sample is taken from the output of the drifting oscillator, the oscillator is reset. The oscillator is always restarted from the same initial conditions. The result is larger randomness, because the drifting oscillator is more sensitive to noise in its start-up phase. In addition, instead of introducing pseudo-periodicity, sampling too fast causes long sequences of equal output bits to be generated.

Sampling too fast can result in mostly equal samples, because the accumulated jitter is not large enough to cause uncertainties at the sampling point. On-line randomness tests for restart mode random number generators (e.g., sampled drifting oscillators) have to detect long sequences of equal samples. Many currently used randomness tests (such as autocorrelation tests, poker tests, etc.) reliably detect a possible problem of this kind, but these tests are unnecessarily complex and expensive.

SUMMARY

In one aspect, the invention provides an apparatus including a first counter for counting successive bits representative of a logic 1, and a second counter for counting successive bits representative of a logic 0, wherein a first predetermined count on the first counter or a second predetermined count on the second counter indicates a randomness failure.

In another aspect, the first counter is reset when a received bit is a logic 0, and the second counter is reset when a received bit is a logic 1.

In another aspect, the invention provides a method including: receiving a sequence of bits representing a plurality of logic 1's and 0's, using a first counter to count successive bits representative of a logic 1 until a logic 0 is received, using a second counter to count the bits representative of a logic 0 until a logic 1 is received, and producing a failure indication when either the first counter reaches a first predetermined count or the second counter reaches a second predetermined count.

These and other features and advantages will be apparent from a reading of the following detailed description.

DETAILED DESCRIPTION OF THE INVENTION

In various aspects, this invention provides a method and apparatus for testing the randomness of a series of bits, by detecting the most likely erroneous, non-random behavior. In one example, the series of bits can be provided by a restart mode random number generator.

Figure 1:
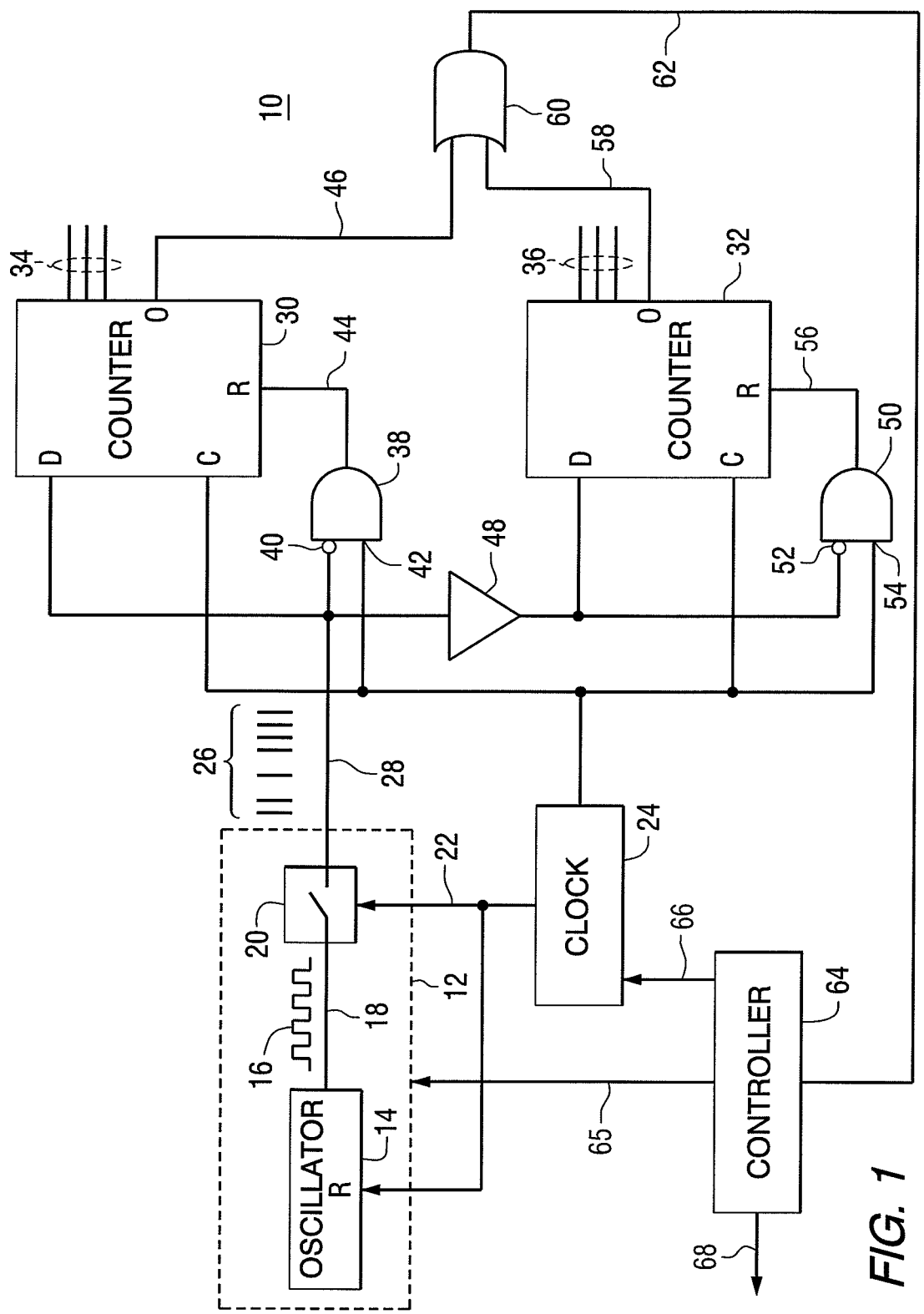
FIG. 1 is a schematic diagram of an apparatus that can be used in accordance with one aspect of the invention.

FIG. 1 is a schematic diagram of an apparatus 10 that can be used to practice one aspect of the invention. A random number generator 12 includes a drifting oscillator 14 that produces a square-wave signal with random edge jitter 16 on line 18. This signal can be in the form of voltage pulses, wherein the magnitude of the pulses represents a logic 1 or 0. Due to oscillator drift and jitter, the timing and duration of the pulses will not be uniform. The random number generator further includes a sampler 20. A clock signal on line 22, which can be produced by a clock 24, is used to control the times at which the sampler samples the pulses and to reset the oscillator. Since the series of pulses is subject to drift and jitter, the output of the sampler should be a series of random bits 26 on line 28.

The random number generator can operate in a restart mode, wherein it is restarted after each clock signal 22, and the oscillator is brought into a known initial state and begins to generate a series of pulses. Due to drift and jitter, the timing of the pulses becomes uncertain and the pulses can be sampled to produce a random sequence of bits. One technique for on-line testing of the randomness of restart mode random number generators detects long sequences of equal samples. FIG. 1 provides a simple and inexpensive device that can implement this test technique.

In FIG. 1, the output of the sampler on line 28 is connected to a first counter 30 and a second counter 32. Each of the counters includes a data input D, a clock input C, a reset input R, and an overflow output O. The counters can also include a plurality of outputs 34 and 36 that represent a cumulative total of bits received on the data input between resets. An AND gate 38 has an inverting input 40 connected to line 28 and another input 42 connected to the clock signal. The output 44 of the AND gate is connected to the reset input of the first counter. When a logic 1 is received at the data input of counter 30, the count on the outputs 34 is incremented by 1. When successive logic 1's are received at the data input, the output will be the total number of successive 1's. When a logic 0 is received at the data input of counter 30, the counter is reset, and the output 34 is reset to all 0's. When the samples are random, the counter is frequently reset to 0. This way, it does not reach a high counter value. When the samples include a long series of logic 1's, the counter 30 may reach its maximum count and produce an overflow signal on line 46. This overflow signal represents a failure indication, which indicates that the sequence of bits on line 28 does not meet a desired randomness criteria.

The second counter 32 performs a similar function, but is reset when the current sample is a logic 1, effectively determining the length of the last all 0 sequence of the samples. This function is achieved by placing an inverter 48 between line 28 and the data input of counter 32. An AND gate 50 has an inverting input 52 connected to the inverter output and another input 54 connected to the clock signal. The output 56 of the AND gate 50 is connected to the reset input of the second counter.

When the samples include a long series of logic 0's, the counter 32 may reach its maximum count and produce an overflow signal on line 58. This overflow signal can be used to indicate that the sequence of bits on line 28 does not meet a desired randomness criteria. The overflow signals from the two counters can be combined in an OR gate 60 to produce a failure indication signal on line 62. Based on the failure indication signal, a controller 64 can then take appropriate action, such as adjusting the parameters of the oscillator 16 using a signal on line 65; or increasing the sampling time by controlling the clock with a signal on line 66 to allow for more uncertainty in the sample pulses. Alternatively, or in addition, the controller may provide a failure signal to the user of the random number generator on line 68.

In the example of FIG. 1, the two counters are incremented each time a bit is output from the random number generator. In this example, a sample is taken at each clock pulse. Alternatively, the counters can also be incremented faster or slower, or decremented with the same end effect.

Counter 30 is reset to the 0 count value when the current sample is a logic 0. This way, it does not reach a high counter value when the samples are random, that is, the counter gets restarted often from 0. Similarly, counter 32 is reset, when the current sample is a logic 1, effectively determining the length of the last all 0 sequence of the samples. When decrementing counters are used, a reset function can be implemented by loading predetermined limit values to the counters, and the overflow outputs would be activated, when the corresponding current count value reaches 0. Other counter configurations can be used to achieve the same effects.

The example of FIG. 1 uses an overflow signal as a failure indication signal. In another example, the output count of the counters could be monitored and the failure indication signal could issue when the count reaches some predetermined value or number. The test fails if the predetermined number is reached. At this point an interrupt command can issue, notifying the controller that an unusual event occurred.

In one example, if 5-bit counters are used, an interrupt can be issued when one of the counters reaches the maximum value (i.e., 31), indicating that 32 successive identical samples were encountered. This can occur in a truly random sequence, but very rarely. Its probability is $2^{-32}$, or one in 4 billion sequences of length 32. Such an occurrence is so infrequent that a practical system might discard the last 32 bits and continue operation. Then if the test fails again within a short period of time, the controller can conclude that the random number generator is broken, or under attack, and halts the random number generation, but other failure policies are possible as well.

Figure 2:
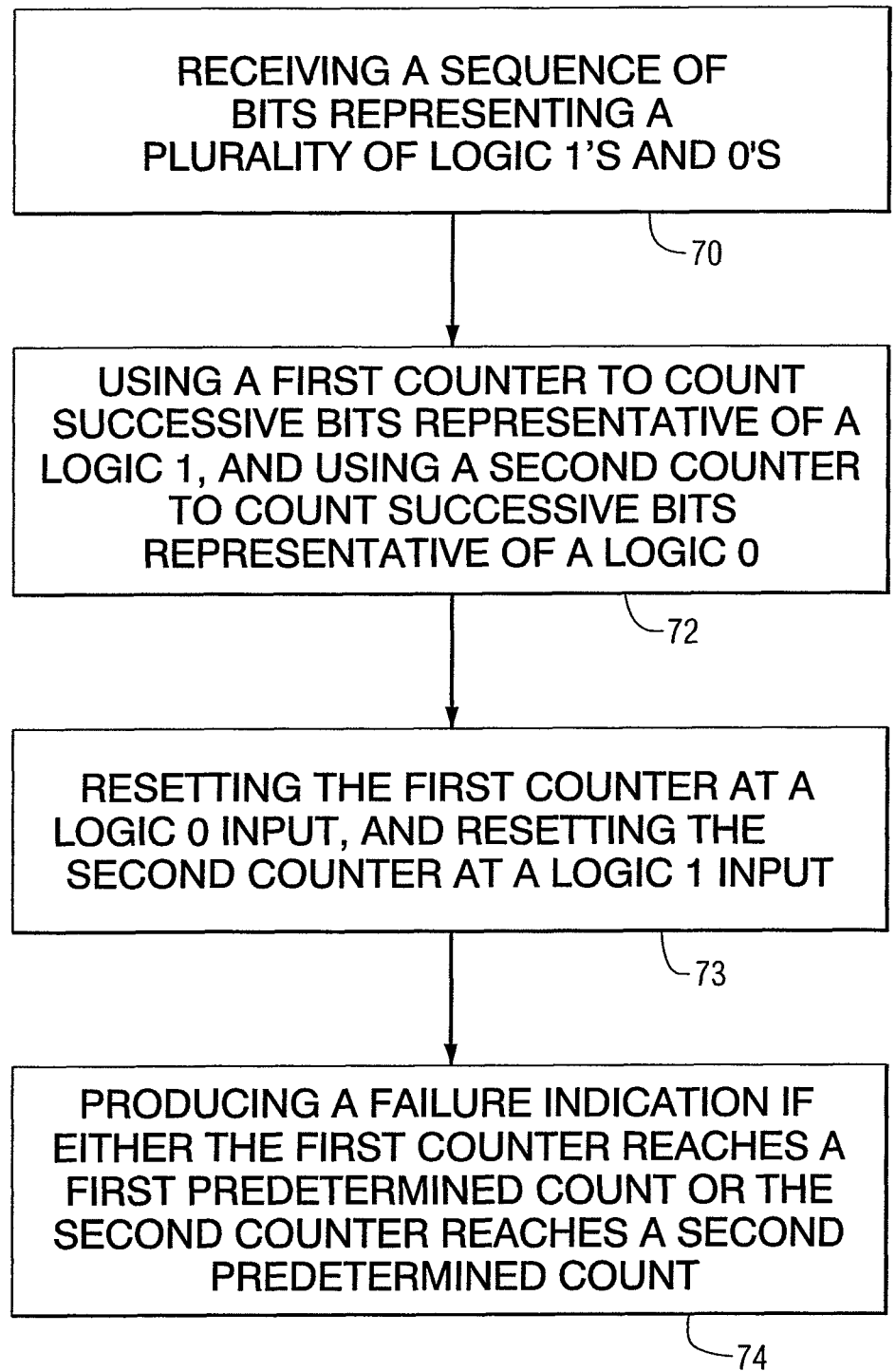
FIG. 2 is a flow diagram that illustrates an aspect of the invention.

FIG. 2 is a flow diagram that illustrates an aspect of the invention. FIG. 2 shows a method that begins by receiving a sequence of bits representing a plurality of logic 1's and 0's, as shown in block 70. A first counter is used to count the bits representative of a logic 1, and a second counter is used to count the bits representative of a logic 0, as shown in block 72. Block 73 shows that the first counter is reset (or restarted) when the binary bit is a logic 0, and the second counter is reset (or restarted) when the binary bit is a logic 1. If either the first counter reaches a first predetermined count or the second counter reaches a second predetermined count, a failure indication is produced, as shown in block 74.

The implementations described above and other implementations are within the scope of the following claims.

What is claimed is:

1. An apparatus comprising:
    a first counter circuit for receiving a series of bits from a random number generator and for counting successive bits in the series of bits representative of a logic 1;
    a second counter circuit for counting successive bits in the series of bits representative of a logic 0;
    wherein the first counter circuit is reset when a received bit in the series of bits is a logic 0, and the second counter circuit is reset when a received bit in the series of bits is a logic 1; and
    wherein a first predetermined count on the first counter circuit or a second predetermined count on the second counter circuit indicates a randomness failure.

2. The apparatus of claim 1, further comprising: a restarted drifting oscillator random number generator for producing the bits.

3. The apparatus of claim 2, further comprising: a controller for adjusting the operation of the restarted drifting oscillator random number generator in response to a randomness failure.

4. The apparatus of claim 1, wherein:
    the first counter circuit is incremented upon receipt of a logic 1; and
    the second counter circuit is incremented upon receipt of a logic 0.

5. The apparatus of claim 1, wherein:
    the first counter circuit is decremented upon receipt of a logic 1; and
    the second counter is decremented upon receipt of a logic 0.

6. A method comprising:
    receiving a sequence of bits representing a plurality of logic 1's and 0's;
    using a first counter circuit to count successive bits representative of a logic 1;
    using a second counter circuit to count the bits representative of a logic 0;
    resetting the first counter circuit when a received bit is a logic 0;
    resetting the second counter circuit when a received bit is a logic 1;
    producing a failure indication when the first counter circuit reaches a first predetermined count; and
    producing a failure indication when the second counter circuit reaches a second predetermined count.

7. The method of claim 6, wherein the bits are produced by a periodically restarted drifting oscillator random number generator.

8. The method of claim 7, further comprising: adjusting the operation of the periodically restarted drifting oscillator random number generator in response to the failure indication.

9. The method of claim 7, further comprising: adjusting a sampling rate of the periodically restarted drifting oscillator random number generator in response to the failure indication.

10. The method of claim 9, wherein: the sampling rate is adjusted by changing a clock frequency.

11. The method of claim 6, wherein:
    the first counter circuit is incremented upon receipt of a logic 1; and
    the second counter circuit is incremented upon receipt of a logic 0.

12. The method of claim 6, wherein:
    the first counter circuit is decremented upon receipt of a logic 1; and
    the second counter circuit is decremented upon receipt of a logic 0.

13. A device comprising:
    a first counter circuit adapted to:
        receive a series of bits;

count successive bits representative of a logic 1 in the series of bits, producing a count of successive ones;

reset the count of successive ones in response to a bit in the series of bits being a logic 0;

a second counter circuit adapted to:

receive the series of bits;

count successive bits representative of a logic 0 in the series of bits, producing a count of successive zeros;

reset the count of successive zeros in response to a bit in the series of bits being a logic 1.

14. The device of claim 13 further comprising:

the first counter circuit produces a failure indication signal when the count of successive ones reaches a threshold; and the second counter circuit produces a failure indication signal when the count of successive zeros reaches a threshold.

15. The device of claim 14 wherein a failure indication signal indicates the series of bits does not meet a desired randomness criteria.

16. The device of claim 15 wherein a failure indication signal comprises a counter overflow signal.

17. The device of claim 16 further comprising:

the first counter circuit comprises a first decrementing counter which can be loaded with a predetermined threshold in response to being reset, wherein a count is decremented from the first decrementing counter when a successive one is received and a failure indication signal is produced when the first decrementing counter reaches a value of zero; and the second counter circuit comprises a second decrementing counter which can be loaded with a predetermined threshold in response to being reset, wherein a count is decremented from the second decrementing counter when a successive zero is received and a failure indication signal is produced when the second decrementing counter reaches a value of zero.

18. The device of claim 16 further comprising:

a failure indication component to receive a first failure indication signal when the count of successive ones reaches a threshold;

the failure indication component to receive a second failure indication signal when the count of successive zeros reaches a threshold; and the failure indication component comprising an OR gate to produce a failure signal based on the first failure indication signal and the second failure indication signal.

19. The device of claim 18 wherein the failure signal comprises an interrupt command to a controller.

20. The device of claim 13 further comprising a monitoring component to:

monitor a first count of the first counter circuit and a second count of the second counter circuit;

compare the first count to a first predetermined threshold;

compare the second count to a second predetermined threshold; and produce a failure signal when either the first count exceeds the first predetermined threshold or the second count exceeds the second predetermined threshold.

* * * * *